United States Patent [19]

Johnson et al.

[11] 4,291,965
[45] Sep. 29, 1981

[54] APPARATUS FOR AUTOMATICALLY SELECTING A PRESELECTED FOCAL POSITION FOR A LENS SYSTEM

[75] Inventors: Bruce K. Johnson, Andover; George D. Whiteside, Lexington, both of Mass.

[73] Assignee: Polaroid Corporation, Cambridge, Mass.

[21] Appl. No.: 194,572

[22] Filed: Oct. 6, 1980

[51] Int. Cl.³ .................. G03B 3/10; G03B 15/03
[52] U.S. Cl. .................... 354/195; 354/126
[58] Field of Search ............ 354/25, 195, 198, 197, 354/126, 145; 352/14 D; 355/56

[56] References Cited

U.S. PATENT DOCUMENTS

| | | | |
|---|---|---|---|
| 3,522,764 | 8/1970 | Biber et al. | 354/195 |
| 3,720,145 | 3/1973 | Johnson et al. | 354/147 |
| 3,871,756 | 3/1975 | Stieringer et al. | 352/140 |
| 3,942,183 | 3/1976 | Whiteside | 354/29 |
| 4,040,072 | 8/1977 | Johnson et al. | 354/173 |
| 4,093,365 | 6/1978 | Isono | 352/140 |
| 4,149,792 | 4/1979 | Fraser et al. | 354/195 |
| 4,153,903 | 5/1979 | Pizzuti et al. | 354/195 |
| 4,160,590 | 7/1979 | Reynard | 354/195 |
| 4,167,316 | 9/1979 | Johnson et al. | 354/197 |
| 4,183,643 | 1/1980 | Imura et al. | 354/25 |
| 4,191,460 | 3/1980 | Fujiki et al. | 354/25 |
| 4,192,587 | 3/1980 | La Rocque et al. | 354/27 |
| 4,199,246 | 4/1980 | Muggli | 354/195 |
| 4,199,316 | 4/1980 | Bradbury | 425/577 |
| 4,221,475 | 9/1980 | Tamura | 354/25 |
| 4,225,219 | 9/1980 | Shimizu | 354/25 |
| 4,231,645 | 11/1980 | Davis et al. | 354/145 |
| 4,243,309 | 1/1981 | Johnson et al. | 354/197 |

*Primary Examiner*—Michael L. Gellner
*Attorney, Agent, or Firm*—Leslie J. Payne

[57] ABSTRACT

An automatic focusing camera having a ranging device, which selects the nearest subject for focusing, including a manually operative member for defeating the ranging device and automatically signalling the lens drive arrangement to move the lens to a preselected focal position when focusing on other than the near subject is desired; as, for example, when focusing through a window with a sonic ranging camera.

8 Claims, 3 Drawing Figures

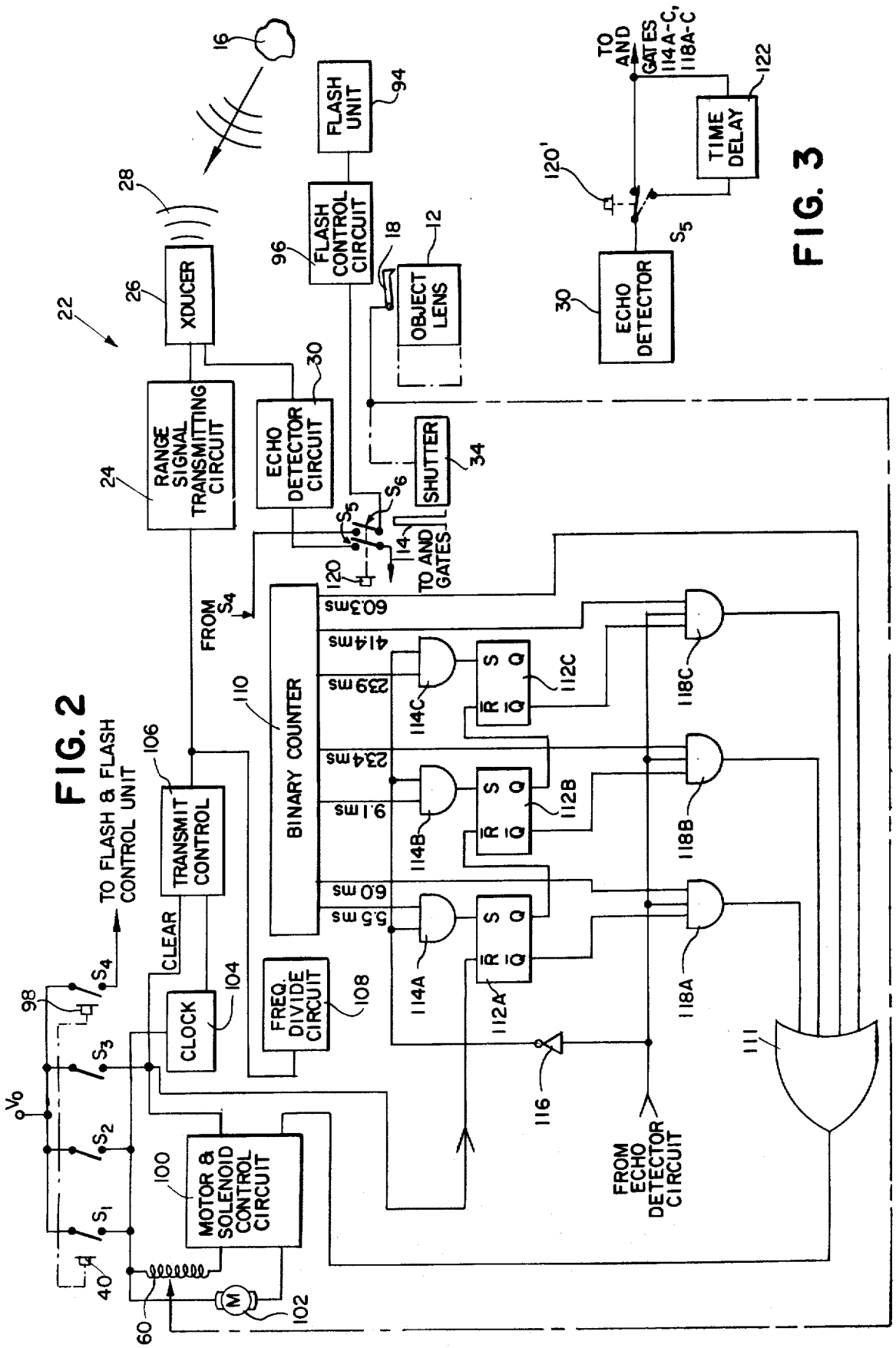

APPARATUS FOR AUTOMATICALLY SELECTING A PRESELECTED FOCAL POSITION FOR A LENS SYSTEM

BACKGROUND OF THE INVENTION

1. Field of the Invention

This invention relates generally to the field of focusing apparatus and, more particularly, selectively actuatable apparatus for automatically causing a variable focus system to have a lens element positioned at a preselected focal position, and for suppressing firing of a source of artificial illumination.

2. Description of the Prior Art

Ultrasonic ranging systems are well-known for use in controlling operations in photographic apparatus. Essentially, ultrasonic energy is transmitted to a subject and the reflected signals from the subject are received by the system. Characteristics of the transmitted and received signals are compared for purposes of deriving a ranging signal indicative of the subject distance. Such signal may be used for purposes of driving an element of a variable objective lens assembly of the photographic apparatus to a position corresponding to the subject distance, whereby the subject will be in focus at a focal plane in the photographic apparatus.

An example of such a system is disclosed in U.S. Pat. No. 4,199,246, entitled "Ultrasonic Ranging System for a Camera", by J. Muggli, assigned in common herewith. This patent describes use of an ultrasonic transducer for transmitting a relatively short burst of ultrasonic frequencies, and a synchronized receiver for processing an echo signal produced by the transducer upon receipt of the echo after a predetermined time interval. This receiver produces a ranging signal having a characteristic related to the distance of the nearest subject being photographed. In response to the ranging signal, a lens element of a variable focus lens system is moved to the appropriate focal position corresponding to the subject range.

Despite several significant advantages of ultrasonic ranging systems and the widespread commercial acceptance thereof, certain photographic conditions exist wherein there are potential for problems. For example, focusing difficulties arise when the object to be focused is not the nearest object in the scene, for example, when it is situated beyond an acoustically opaque, but visually transparent material, such as a window. This is because the rangefinder will range on the window rather than the object beyond the window. Obviously, the desired subject will be misfocused at the focal plane.

Towards the end of correcting such problems efforts have been undertaken to provide these types of automatic focusing systems with an override system enabling independent manual control of the focusing system. Examples of such efforts are described in U.S. Pat. Nos. 4,149,792, 4,153,903 and 4,160,590, all commonly assigned herewith.

Thus, the foregoing patents disclose a manual control system for focusing in addition to an automatic focusing system. In such systems a manual focus wheel is operable for achieving the manual focusing when the automatic rangefinder is disabled. Disabling of the automatic focus control system may be effected by rendering the automatic focus control insensitive to the output signal from the rangefinder, by disabling the rangefinder itself or by any combination thereof.

In U.S. Pat. No., 4,149,792, a spring force biasing means is operative in the manual focusing mode for urging the lens from a position outside its normal focusing range to a position inside the normal focusing range to provide correct operation when the camera is later returned to the automatic mode. This latter positioning is therefore done to facilitate the automatic focusing mode and, consequently, does not directly overcome the above-noted problem associated with misfocusing of automatic rangefinders. Commonly assigned U.S. Patent No. 4,160,590 discloses a lens movement limiting stop that limits manual movement of a lens to within its normal focusing range. This patent, like other prior art, requires focusing control by the operator when faced with the problem of focusing upon objects located behind acoustically opaque and visually transparent material.

SUMMARY OF THE INVENTION

In accordance with the present invention, there are provided improved apparatus for automatically controlling focusing of a variable focus lens assembly.

As in prior automatic focus apparatus for use in automatically focusing image forming rays at a focal plane, there is provided ranging means for deriving a signal indicative of the range of the nearest subject from the apparatus. Included in such apparatus is a variable focusing objective lens assembly having at least one lens element displaceable to different focal positions so that at each focal position the image forming light rays from a subject at corresponding different distance ranges from the apparatus are focused at the focusing plane. Means are provided for mounting the lens assembly for movement of its lens element to different focal positions. Responsive to the ranging means are positioning means for positioning the lens element to a focal position corresponding to the subject range.

In an illustrated embodiment, manually actuatable means are provided for signalling the positioning means to automatically move the lens element to a preselected one of the focal positions rather than that selected by the ranging means.

In one illustrated embodiment, the ranging means provides a timed signal related to subject range, and the positioning means operates to move the lens element to each respective focal position in response to receipt of ranging sigals within specified times and operates to move the lens element to the preselected one of the focal positions in the absence of a ranging signal. In this embodiment, the actuatable means precludes receipt of a ranging signal by the positioning means so that the positioning means causes displacement of the lens element to the preselected position.

In another illustrated embodiment, the selectively actuatable means additionally suppresses the firing of an artificial illumination device.

It is an object of the present invention to make provision for an improved automatic focusing control apparatus for positioning a lens element of an automatic variable focus lens arrangement at a preselected focal position; the provision of providing a range responsive automatic focusing system with a mechanism for automatically positioning an element of a variable objective lens assembly to a preselected focal position; and, the provision of an improve apparatus for automatically preselecting the position of the lens element of a variable focal lens assembly to a preselected focal position and for suppressing flash firing.

BRIEF DESCRIPTION OF THE DRAWINGS

FIG. 2 is a block circuit diagram of a photographic apparatus including the automatic lens focusing apparatus of this invention; and FIG. 3 is a block circuit diagram showing an alternate preferred embodiment of this invention.

DETAILED DESCRIPTION

Figure 1:
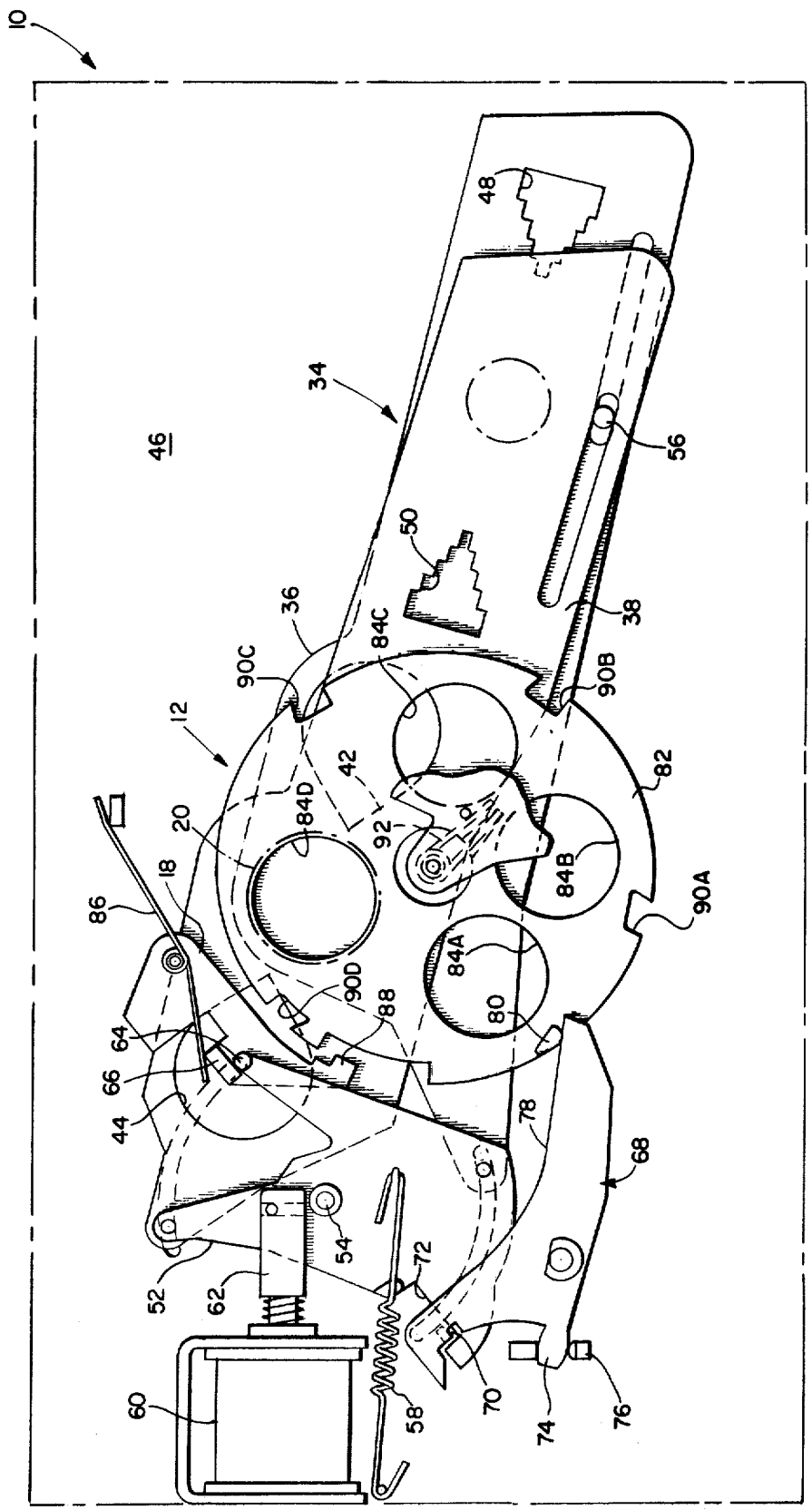
FIG. 1 is a front elevational view showing portions of the automatic lens focusing apparatus and shutter blade mechanism.

FIG. 1 shows a block diagram for a photographic camera apparatus 10 embodying the automatic lens focusing arrangement of this invention. Included in the camera apparatus 10 is an objective lens arrangement or assembly 12 shown in simplified fashion for purposes of clarity. The lens assembly 12 is movable between a plurality of different focal positions corresponding respectively to different camera-to-subject distance ranges. During each film exposure operation, the objective lens assembly 12 is displaced, in a manner to be described, to one of its focal positions for focusing at a focal plane 14 (FIG. 2) the image forming light rays from a respective photographic subject 16 (FIG. 2) located within one of the distance ranges from the camera apparatus 10.

The lens assembly 12 is stopped at any one of its different focal positions by a lens stopping means which in this embodiment includes a releasable lens pawl shown generally at 18 in FIG. 1.

In its initial terminal position, the lens assembly 12 operates to focus image-forming light rays from a photographic subject located at the closest possible or near distance range to the camera within the aforementioned camera-to-subject distance ranges. In the other terminal position (phantom lines in FIG. 2), the lens assembly 12 operates to focus image-forming light rays from a photographic subject located at the furthest possible or far range from the camera within the aforementioned camera-to-subject distance ranges. In the latter terminal position, subjects at the hyperfocal or infinity distances from the camera are in focus at the focal plane. The movement of the lens assembly 12 from its initial terminal position toward its other terminal position progressively focuses image-forming rays from corresponding subjects located at progressively increasing distance ranges from the camera.

The photographic apparatus 10 also includes a sonic rangefinder 22 which provides means for providing a range signal indicative of the subject distance from the camera apparatus 10. Details of the sonic rangefinder 22 do not, per se, form an aspect of this invention and reference is made to U.S. Pat. No. 4,199,246 entitled "Ultrasonic Ranging System For a Camera", by J. Muggli, issued Apr. 22, 1980, and U.S. Pat. No. 4,167,316 entitled "Sonar Controlled Lens Focus Apparatus", by B. Johnson et al., issued Sept. 11, 1979, in common assignment herewith for a more complete description thereof. However, for purposes of understanding this invention, it will be understood that the rangefinder 22 includes a range signal transmitting circuit 24 actuated to issue a transmit commence signal to a sonic transducer 26. This causes transmission from the transducer 26 of a sonar ranging signal comprising a burst of sonic energy 28. Thereafter, the transducer 26 operates to detect an echo signal reflected from the photographic subject 16. Such detection occurs at an elapsed time interval subsequent to the transmission of the sonar ranging signal. For providing a signal indicative of the elapsed time period, there is provided an echo detector 30 circuit. Such circuit 30 derives an elapsed time signal corresponding directly to the distance between the camera and the subject 16. Thus, the sonic rangefinder 22 provides an indication of an elapsed time period corresponding to the distance between the camera and the subject 16. It is to be understood that other rangefinding systems are contemplated instead of the sonar type.

Intermediate the objective lens assembly 12 and the focal plane 14 is a shutter mechanism 34. This shutter mechanism 34 comprises two overlapping shutter blade elements 36, 38 (FIG. 2) of the so-called scanning type. The photographic apparatus 10 is provided with a photographic cycle initiating button as shown at 40 in FIG. 2. Depression of the button 40 operates to commence an exposure interval in a manner to be described.

Referring back to the shutter blades 36, 38, FIG. 1 shows a pair of scene light admitting primary or taking apertures 42 and 44 provided respectively in the blade elements 36, 38. These apertures 42, 44 when overlapping collectively define a progressive variation of effective aperture openings responsive to longitudinal and lateral displacement of one blade with respect to the other. This type of action is described more fully in U.S. Pat. No. 3,942,183 entitled "Camera with Pivoting Blades", by G. Whiteside, issued Mar. 2, 1976, and assigned in common herewith. The apertures 42 and 44 are selectively shaped to overlap a light entering exposure opening 20 in a base block casting 46 which supports the shutter mechanism 34.

The shutter blades 36 and 38 include photocell apertures 48 and 50; respectively. As apparent from a reading of the foregoing patent, the photocell apertures 48 and 50 move in correspondence with the taking apertures 42 and 44 and overlap for defining an effective small secondary aperture for admitting passage of scene light to a light detecting station including photoresponsive element 51 stationed in the base block 46.

Distal end portions of the shutter blade elements 36, 38 are connected to a walking beam 52 which extend laterally outwardly from the walking beam. The walking beam 52 is disposed for rotation relative to the base block casting 46 about pivot pin 54 formed on such casting. These pin members extend through respective openings in the blade elements 36, 38 for slidably engaging respective arcuate tracks formed in the casting 46 so as to inhibit shutter blade disengagement. A pin 56 also retains the blade elements 36, 38 to the casting 46 and allows the latter to be displaced in their intended manner.

For displacing the shutter blade mechanism 34 a drive means is provided which includes an opening tension spring 58 and a tractive electromagnetic device, such as a solenoid 60. The tension spring 58 is fixedly connected at one end to the base block casting 46 and at its other end to the walking beam 52. Such connection serves to yieldably bias the walking beam 52 so as to rotate the latter in a clockwise direction about the pivot pin 64. Included in the solenoid 60 is an internally disposed cylindrical plunger unit 62 which retracts into the solenoid body upon the energization of a solenoid winding. The solenoid plunger 62 is affixed to the walking beam 52 so that longitudinal plunger displacement rotates the walking beam for ultimately displacing the shutter blades 36, 38 in a manner which is known. Integral with the walking beam 52 is a pin 64 constructed and arranged for engaging a tab 66 on the lens pawl 18. The reasons for such engagement will become more apparent from the following discussion.

For maintaining the shutter blade elements 36, 38 in their scene light blocking arrangement without requiring the continuous energization of the solenoid 60, there is provided a combined walking beam latch and lens actuator member 68. The member 68 is disposed for rotation about a pivot pin connected to the casting 46, as is fully described in U.S. patent application Ser. No. 17,196 entitled "Walking Beam Latch and Lens Disc Actuator Arrangement", by B. Johnson, filed Mar. 5, 1979, in common assignment herewith. A tang 70 projects from the latch and actuator member 68 into the locus of travel of the walking beam 52 for engaging and edge 72 thereof. Such engagement inhibits clockwise rotation of the walking beam 52. The latch and actuator member 68 has a depending arm portion 74 engaged by the end of an actuator arm 76. The actuator arm 76 is moved downwardly and then upwardly in a manner as is more fully described in U.S. Pat. No. 4,040,072, entitled "Shutter Latch Arrangement Releasable Through Shutter Blade Actuation and Resettable Through Film Advancement," by B. Johnson et al., issued Aug. 2, 1977. This movement of the actuator arm 76 operates first for imparting counterclockwise rotation to the latch and actuator member 68. The significance of this will be more fully described herein. The latch and actuator member 68 also includes a leading edge portion 78 for engaging an integral pin 80 extending laterally from the lens carrier 82 of the objective lens arrangement 12 so as to rotatably drive the latter about its axis in concert with the unlatching of the walking beam 52.

Turning back to the objective lens assembly 12, it comprises a plurality of lens elements 84A-84D carried by the disc-like lens carrier 82. Thus, the lens carrier 82 provides means for mounting the lens elements 84A-84D for rotational displacement. A more complete description of the lens carrier 82 of the lens assembly 12 is given in the last-noted copending application, since it does not itself form an aspect of this invention. Basically though, each lens elements 84A-84D has a different focal length and depth of field characteristic which correspond respectively to a different one of the aforementioned plurality of focal positions as is fully described in U.S. Pat. No. 4,192,587 entitled "Proportional Fill Flash", by A. LaRocque et al., issued Mar. 11, 1980, in common assignment herewith and now incorporated by reference herein. Rotation of the lens carrier 82 sequentially moves each of the lens elements 84A-84D into overlying relationship with the exposure opening 20. Hence, when each of the lens elements 84A-84D overlies the exposure opening 20, the objective lens assembly 12 operates to focus a subject located at any distance from the camera within a given range of distances.

Returning back to the lens pawl 18, it is mounted for rotation about a pivot pin on the casting 46. The pawl 18 is yieldably biased for rotation in a counterclockwise direction by means of a torsion spring 86 interconnected between the casting 46 and the lens pawl 18. A tang 88 is formed on the pawl 18 for respective engagement in one of a plurality of circumferentially spaced apart catches or notches 90A-90D formed in the periphery of the lens carrier 82. For resiliently biasing the lens carrier 82 so as to rotate it in a manner for returning it to its initial position, subsequent to being rotated by the latch and actuator member 68, there is a torsion spring 92 connected in a manner more fully described in the last-noted application.

The camera may be provided with an integral electronic flash or strobe unit 94 (FIG. 2). The flash control charging circuitry 96 is of the type described more fully in copending application Ser. No. 54,652 entitled "Camera with Telescoping Dual Actuators", by C. Davis et al., filed July 3, 1979, in common assignment herewith. The strobe preferably derives charging power from a battery (not shown) that is insertable within the camera in correspondence with the film pack or cassette in a manner that is well known in the art for Polaroid SX-70-type film cassettes and cameras. Actuation of a flash charging button 98 closes the $S_4$ switch which serves to energize the flash control circuit 96 and flash unit 94.

The aforementioned film battery powers the circuitry in FIG. 1 in its entirety by way of three switches $S_1$, $S_2$, and $S_3$ in a manner as is more fully described in U.S. Pat. No. 4,040,072, supra. A motor and solenoid control circuit 100 is provided which operates in a manner also more fully described in U.S. Pat. No. 4,040,072. Basically, the motor and solenoid control circuit 100 operates to control the energizing current delivered to the solenoid and to a motor 102. The film units intended for use with the camera of this invention are preferably of the self-developing type and the motor 102 is provided to effect the advancement and processing of the self-developing film units in a well-known manner.

Referring back to FIG. 1, the control circuitry for the camera apparatus including the automatic focusing apparatus are shown. Upon closure of the switches $S_1$ and $S_2$, the burst of sonar energy 28 is derived from a clock 104. In this regard, the clock pulse from the clock circuit 104 is directed to a transmit control circuit 106 for controlling the transmission of the clock pulse to the sonic rangefinder 22 as a function of a logic signal derived upon closure of the switch $S_3$. The output clock pulse from the transmit control circuit 106 is also directed to a frequency divide circuit 108. The frequency divide circuit 108 reduces the clock pulse frequency and, thereafter, directs the reduced frequency clock pulse to input a binary counter 110. By manually actuating the button 40 a photographer may initiate a photographic exposure cycle. This actuation closes the switch $S_1$ as is described in U.S. Pat. No. 4,040,072. Closure of the switch $S_1$, in turn, energizes the motor and solenoid control circuit 100 which, in turn, energizes the solenoid 60 to retract the plunger 62 inwardly and rotate the walking beam 52 for rotation in a counterclockwise direction from its position as shown in FIG. 1 to a position not shown. During walking beam rotation, the pin 64 engages the tab 66 to rotate the lens pawl 18 in a counterclockwise direction. The noted rotation of the walking beam 52 also displaces the trailing edge 72 thereof out of engagement with the latching tang 70. The latch member 68 is free to rotate in a counterclockwise direction by the downward movement of the actuator arm 76 which results directly from the aforementioned manual actuation of the button 40. This is fully described in U.S. Pat. No. 4,040,072. The latch actuator 68 is rotated in a manner to permit the subsequent rotation of the walking beam 52 in a clockwise direction for driving the blades to their maximum aperture defining position.

Counterclockwise rotation of the latch and actuator member 68 also causes its leading edge 78 to impact upon the pin 80 for rotating the lens carrier 82 in a clockwise direction. Of course, the lens elements 84A-84D are then free to sequentially move into focal positions overlapping the light entry exposure opening 20.

Downward movement of the actuator arm 76 effects release of the member 68 and effects closing of the switches S$_2$ and S$_3$, in a manner fully described in U.S. Pat. No. 4,040,072.

Closure of the switch S$_3$ operates to power down the solenoid 60 from the initial high current energization condition, required to retract the plunger 62, to a low current energization condition, required to hold the plunger in its retracted position (not shown) as is fully described in U.S. Pat. No. 4,192,587. Closure of the switch S$_3$ also actuates the sonar rangefinder 22 by providing the requisite logic signal to the transmit control circuit 106. Thus, the clock pulse from the clock circuit 104 is transmitted to the range signal transmitting circuit 24. Also, the transmit control circuit 106 directs the clock pulse to the frequency divide circuit 108 for inputting the counter 110 in correspondence with the transmission of the sonar rangefinding signal 28.

FIG. 2 shows an embodiment of a binary logic circuit used for setting the lens elements 84A-84D in their respective overlying relationship in response to the echo signal from the echo detector circuit 30. Since details of this circuitry do not, per se, form an aspect of this invention, reference is made to the last-noted copending application. For better understanding this embodiment, however, a brief description of its construction and operation will be set forth. The binary logic circuit includes a plurality of flip-flop circuits 112A-112C which connect respectively to a plurality of AND gates 114A-114C to provide solenoid release signals to the motor and solenoid control circuit 100 by way of OR gate 111. These release signals, as is described in said last-noted application, deenergize the solenoid 60 for releasing the walking beam 52 for rotation by the opening drive spring 58. The shutter mechanism 34 will thereafter be driven through a range of progressively varying aperture sizes to define a photographic exposure cycle. In this regard, it will be understood that clockwise rotation of the walking beam 52 operates to disengage the pin 64 from the tab 66 on the lens pawl 18 to thereby release the latter so that the tang 88 is driven into engagement with the periphery of lens carrier 82, by the urging of the torsion spring 86, until the tang falls into the appropriate one of the notches 90A-90D.

The flip-flops 112A-112C are set in sequence from the output lines of the counter 110, for example, at 5.5 milliseconds, 9.1 milliseconds and 23.9 milliseconds, respectively, by way of AND gates 114A-C. The AND gates 114A-C also receive input signals from the echo detector circuit 30 by way of the inverter 116, while the AND gates 118A-C are provided logic signals from the counter 110 at, for example, 6.0 ms, 23.4 ms and 41.4 ms; respectively. The AND gates 118A-C also receive input signals from the echo detector circuit 30, as well as, of course, the flip-flops 112A-C, respectively.

Briefly, in operation closure of the switch S$_3$ will reset the flip-flop 112A so that output terminal Q provides a low (binary logic 0) output signal level while conversely output terminal $\overline{Q}$ provides a high (binary logic 1) output signal level.

If the photographic subject is located within the first and nearest camera-to-subject distance range of, for example, less than three feet, then an echo signal will be received within approximately 5.5 milliseconds of transmission of the sonar ranging signal to provide a high (binary logic 1) signal level to one input terminal of the AND gate 118A and a low (binary logic 0) signal level to one input terminal of the AND gate 114A by way of an inverter 116. Subsequent receipt of a high (binary logic 1) output signal level from the counter 110 at the expiration of approximately 6 milliseconds from the transmission of the sonar ranging signal and the initial rotation of the lens carrier 82 operates to switch the AND gate 118A to provide the high (binary logic 1) output signal level to the solenoid 60 by way of the OR gate 111. More specifically, an assertive output logic signal is provided to the motor and solenoid control circuit 100 which will deenergize the solenoid 60 and release the walking beam 52 for rotation by the opening drive spring 58.

The shutter blade mechanism 34 will thereafter be driven through a range of progressively varying aperture sizes to define a photographic exposure cycle in a manner as is fully described in U.S. Pat. No. 4,192,587. Clockwise rotation of the walking beam 52 in the aforementioned manner also operates to disengage the pin 64 from the right angle tab portion 66 of the lens pawl 18 so as to release the lens pawl 18 for being driven into engagement with the periphery of the lens carrier 82 in the space between the pair of notches 90D and 90A by the urging of the spring 86. After engaging the lens carrier periphery the carrier continues to rotate, in a counterclockwise direction, until the tang 88 engages the trailing edge of the notch 90B. This stops lens carrier rotation and locates the lens element 90A in the noted overlying focal position.

If the photographic subject is located in the second or third camera-to-subject distance ranges, the noted binary logic circuit will operate in a manner more fully described in the last-noted application to appropriately release the solenoid 60, after a preselected time in accordance with elapsed echo signal, and thereby the lens pawl 18 so that the tang 88 will cooperate with a respective one of the notches for stopping rotation of the lens carrier 82 so that the lens elements 84B or 84C, respectively, are in their desired overlapping focal position.

If, for example, the subject is located in the fourth or far distance range, for example, at a hyperfocal or infinity range, then the echo signal will be received subsequent to 23.9 milliseconds and flip-flop 112C will be set so that the assertive output logic signal provided by the binary counter 110 will provide the controlling solenoid release signal at, for example, 60.3 milliseconds, subsequent to transmission of the sonar ranging signal and actuation of the lens carrier.

It should be readily understood that a photographic exposure cycle commences in synchronism with release of the walking beam 52 and lens pawl 18 in a manner as is more fully described by U.S. Pat. No. 4,192,587 and thus will not be further described herein. As is now readily apparent, the timing sequence, provided by the aforementioned logic circuits in conjunction with the counter 110, allows the lens pawl 18 to be released at times ensuring that the lens pawl engages the lens carrier 82 in a space between a pair of adjacent notches.

Reference is made to FIG. 1 for better describing the means for automatically causing the objective lens assembly 12 to move to one preselected focal position. Preferably, in this embodiment the lens carrier 82 is disposed for rotational movement so that the hyperfocal lens element 84D is moved to be in the noted overlying position for focusing purposes when the automatic preselected focusing means is actuated in a manner to be described. In this embodiment, the preselected focusing includes a springbiased infinity switch button 120 which is manually actuated. The infinity switch button 120 is effective upon such actuation to cause infinity switch S₅ to open for preventing the echo detector circuit 30 from transmitting its input signal to respective ones of the AND gates 114A-C and 118A-C. In this manner, it will be appreciated that because the AND gates 114A-C and 118A-C will not receive the echo signal the binary counter 110 is responsive to the absence of the echo to then provide the assertive logic input through the OR gate 111 to the motor and solenoid control circuit 100 as previously indicated, at approximately 60.3 milliseconds subsequent to transmission of the sonar ranging signal 28 and actuation of the lens carrier 82, for ultimately releasing the solenoid 60 as explained above. Hence, the lens element 84D will be stopped in the desired overlapping position by reason of the lens pawl 18. The foregoing therefor provide means for positioning the lens elements to a preselected focal position. Thus, the focal plane 14 will have focused thereon image bearing light rays from the subject at a hyperfocal distance from the camera.

Advantageously, the foregoing prevents the sonic rangefinder 22 from causing the objective lens assembly 12 to focus on a nearby window when the subject to be photographed is beyond the acoustically opaque, but optically transparent, window. Thus, the subject 16 will be in focus at the focal plane.

Preferably, generally simultaneously with the foregoing automatic preselected focusing operation the opening of the S₆ switch operates to inhibit the flash unit 94 from being fired during exposure. This is advantageous since the flash 94 will not be actuated when exposure through a window is taking place. Hence, reflection of the pulse of artificial illumination will not operate to adversely affect exposure.

Reference is made to FIG. 3 for illustrating another embodiment of this invention. The foregoing automatic focusing arrangement of FIG. 1 may be modified as shown in FIG. 3 by the addition of a time delay circuit 122 interposed between the echo detector circuit 30 and the AND gates 114A-C and 118A-C as shown. Actuation of the infinity switch button 120' will open switch S₅', whereupon the time delay circuit 122 can introduce a preferred echo signal after a preselected time interval into a respective one of the AND gates 114A-C and 118A-C much as in the manner of a real echo signal. Of course, the opening of S₅' will prevent the real echo signal from reaching the noted AND gates. The beginning of the time interval for the preferred echo signal commences from the transmission of the echo ranging signal 30. Such preferred echo signal provides the assertive logic input through the OR gate 111 to the motor control circuit 100 whereby the lens carrier 82 will be stopped by the lens pawl 18 so that the particular lens element 84A-C is stopped in the focal position corresponding to the particular camera-to-subject range which, in turn, corresponds to the preferred echo signal. Thus, the time delay circuit 122 can set the lens carrier 82 to a desired focal position whereby a desired one of the lens elements 84A-C is in the noted overlying relationship. This embodiment envisions that the lens element 84D be used whenever the S₅' switch is opened in the manner indicated above. To achieve this setting, of course, the time delay circuit 122 will not cause transmission of the preferred echo signal, whereby due to the absence of such a signal the binary counter (not shown) will, as in the previous embodiment, provide the assertive logic signal through the OR gate 111 to the motor and solenoid control circuit 100 for deenergizing the solenoid 60 and effecting engagement of the lens pawl 18 with the carrier 82 so that the lens element 84D is in the desired overlying condition. Thus, the foregoing provides means for positioning the lens element to a preselected focal position.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. In an apparatus for automatically focusing image forming rays at a focal plane having ranging means for deriving a signal indicative of the range of a subject from the apparatus, a variable focusing objective lens assembly having at least one lens element displaceable to different focal positions so that at each focal position the image carrying light rays from a subject at corresponding different distance ranges from the apparatus are focused at the focal plane, means for mounting the lens assembly for movement of its lens element to the different focal positions, and positioning means responsive to the ranging means for positioning the lens element to a focal position corresponding to the subject range, the improvement comprising:

manually actuatable means for disabling the ranging means and for signalling the positioning means to automatically move a lens element to a preselected one of the focal positions.

2. The apparatus of claim 1 wherein said actuatable means disables the ranging means and provides a selected range signal to the positioning means for causing movement of the lens element to said preselected focal position.

3. The apparatus of claim 1 wherein the ranging means provides a timed signal related to subject range, and the positioning means operates to move the lens element to each respective focal position in response to receipt of ranging signals within specified times and operates to move the lens element to the preselected one of the focal positions in the absence of a ranging signal and said actuatable means precludes receipt of the ranging signal by the positioning means so that the positioning means causes movement of the lens element to the preselected focal position.

4. The apparatus of claim 2 or 3 wherein the preselected one of the focal positions is the hyperfocal position of the lens assembly.

5. The apparatus of claim 2 or 3 wherein said apparatus includes means for firing a pulse or artificial illumination, and said actuatable means additionally includes means for suppressing firing of said flash means in response to the actuatable means being actuated.

6. The apparatus of claim 1 wherein the lens assembly is focusable over a range of near to far subject distance in accordance with the position of the displaceable lens element, the lens element, during each focusing of the apparatus, being displaced by the positioning means from an initial position located near one end of the focusing range to the selected position in the range, and the actuatable means includes means for signalling the positioning means to move the lens element from its initial position through at least an adjoining focal position to the preselected one of the focal positions.

7. The apparatus of claim 6 wherein the preselected focal position is the focal position forming the other end of focusing range.

8. The apparatus of claim 7 wherein the preselected focal position is for focusing at far distances.

* * * * *